(12) United States Patent
Lee et al.

(10) Patent No.: US 7,893,119 B2
(45) Date of Patent: Feb. 22, 2011

(54) POLYMER ELECTROLYTE MEMBRANE, METHOD OF PREPARING THE SAME AND FUEL CELL INCLUDING THE SAME

(75) Inventors: Jin-gyu Lee, Seoul (KR); Sang-kook Mah, Seoul (KR); Myung-sup Jung, Seongnam-si (KR); Jae-jun Lee, Suwon-si (KR); Do-yun Kim, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1116 days.

(21) Appl. No.: 11/604,974

(22) Filed: Nov. 27, 2006

(65) Prior Publication Data
US 2007/0190385 A1 Aug. 16, 2007

(30) Foreign Application Priority Data
Feb. 14, 2006 (KR) ...................... 10-2006-0014244

(51) Int. Cl.
*C08J 5/20* (2006.01)
(52) U.S. Cl. ....................................................... 521/27
(58) Field of Classification Search .................... 521/27
See application file for complete search history.

(56) References Cited

U.S. PATENT DOCUMENTS

| 6,878,475 | B2 * | 4/2005 | Wixom et al. ................. 429/33 |
| 2004/0106030 | A1 * | 6/2004 | Wixom et al. ................. 429/33 |
| 2006/0014877 | A1 | 1/2006 | Taylor-Smith | |
| 2006/0148953 | A1 * | 7/2006 | Hong et al. ................. 524/431 |

FOREIGN PATENT DOCUMENTS

| JP | 2001-247741 | 9/2001 |
| JP | 2002-343381 | 11/2002 |
| JP | 2005-089705 | 4/2005 |
| JP | 2005-248114 | 9/2005 |
| JP | 2005-339961 | 12/2005 |
| JP | 2006-032213 | 2/2006 |

OTHER PUBLICATIONS

SIPO Registration Determination Certificate dated Nov. 25, 2009, for corresponding Chinese application 200710003925.1, noting listed references in this IDS.
Japanese Office action dated Aug. 10, 2010, for corresponding Japanese Patent application 2007-025769, noting listed references in this IDS, as well as U.S. Publication 2006/0014877, JP 2001-247741, and JP 2005-339961, all previously filed in an IDS dated Oct. 16, 2007 and Feb. 17, 2010.
Japanese Office action dated Aug. 10, 2010, for corresponding Japanese Patent application 2007-025769, with English translation, noting references filed in an IDS dated Sep. 7, 2010, as well as U.S. Publication 2006/0014877, JP 2001-247741, and JP 2005-339961, all previously filed in an IDS dated Oct. 16, 2007 and Feb. 17, 2010.

* cited by examiner

*Primary Examiner*—Bernard Lipman
(74) *Attorney, Agent, or Firm*—Christie, Parker & Hale, LLP (57) ABSTRACT

A polymer electrolyte membrane including a polysilsesquioxane group-containing copolymer and an ionic conductive polymer is provided. A method of preparing the polymer electrolyte membrane and a fuel cell including the polymer electrolyte membrane is also provided. The polymer electrolyte membrane has improved ion conductivity and an improved ability to suppress methanol crossover, and therefore can be used as an electrolyte membrane for a fuel cell, including a direct methanol fuel cell.

18 Claims, 5 Drawing Sheets

POLYMER ELECTROLYTE MEMBRANE, METHOD OF PREPARING THE SAME AND FUEL CELL INCLUDING THE SAME

CROSS-REFERENCE TO RELATED PATENT APPLICATION

This application claims priority to and the benefit of Korean Patent Application No. 10-2006-0014244, filed on Feb. 14, 2006, in the Korean Intellectual Property Office, the disclosure of which is incorporated herein in its entirety by reference.

BACKGROUND OF THE INVENTION

1. Field of the Invention

The present invention relates to a polymer electrolyte membrane, a method of preparing the same and a fuel cell using the same.

2. Description of the Related Art

Fuel cells may be classified according to the type of electrolyte used therein. Types of fuel cells include polymer electrolyte membrane fuel cells (PEMFCs), phosphoric acid fuel cells, molten carbonate fuel cells, solid oxide fuel cells, and others. The operating temperatures of fuel cells and constituent materials thereof vary depending on the electrolyte type.

According to a method of supplying fuel to an anode, fuel cells can be classified into external reforming type fuel cells in which fuel is supplied to the anode after being converted into hydrogen enrichment gas by a fuel reformer, and internal reforming type fuel cells in which fuel in liquid or gaseous state is directly supplied to the anode.

A representative example of a direct fuel supply type fuel cell is a direct methanol fuel cell (DMFC). In a DMFC, an aqueous methanol solution is used as fuel, and a proton conductive polymer electrolyte membrane is used as an electrolyte. Accordingly, a DMFC is a kind of PEMFC.

A PEMFC is small and lightweight but can achieve a high output density. Furthermore, a power generation system can be easily constituted using a PEMFC.

A basic PEMFC may include an anode (fuel electrode), a cathode (oxidizing agent electrode), and a polymer electrolyte membrane interposed between the anode and the cathode. The anode may include a catalyst layer to promote fuel oxidation. The cathode may include a catalyst layer to promote the reduction of an oxidizing agent.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient ionic conductivity, electrochemical safety, high mechanical strength, thermal stability at its operating temperature, and should be capable of being easily formed in a thin layer.

SUMMARY OF THE INVENTION

One embodiment of the present invention provides a polymer electrolyte membrane that has improved ionic conductivity and that is effectively able to prevent methanol crossover, and a method of preparing the polymer electrolyte membrane.

Another embodiment of the present invention further provides a fuel cell in which methanol crossover is reduced by using the polymer electrolyte membrane.

According to an embodiment of the present invention, a polymer electrolyte membrane is provided comprising: a copolymer containing polysilsesquioxane group; and an ionic conductive polymer.

According to another embodiment of the present invention, a method of preparing a polymer electrolyte membrane is provided, the method comprising: providing a composition for preparing a polymer electrolyte membrane comprising a polysilsesquioxane group-containing copolymer group, an ionic conductive polymer and solvent; applying the composition for preparing a polymer electrolyte membrane to a substrate; and heating the applied composition for preparing a polymer electrolyte membrane.

According to another embodiment of the present invention, a fuel cell is provided comprising: a cathode; an anode; and the polymer electrolyte membrane that is interposed between the cathode and the anode.

In one embodiment, the cathode comprises carbon supported platinum catalyst layer and the anode comprises carbon supported platinum-ruthenium catalyst layer.

BRIEF DESCRIPTION OF THE DRAWINGS

The above and other embodiments of the present invention will become more apparent by describing in detail exemplary embodiments thereof with reference to the attached drawings in which.

DETAILED DESCRIPTION

According to an embodiment of the present invention, a polymer electrolyte membrane comprising a polysilsesquioxane group-containing copolymer and an ionic conductive polymer is provided.

The term "polysilsesquioxane group-containing copolymer" infers that the polysilsesquioxane group is included as a part of the main chain of the copolymer or the side chain of the copolymer.

The polysilsesquioxane group-containing copolymer which is included in the polymer electrolyte membrane according to an embodiment of the present invention reduces the free volume in the polymer electrolyte membrane and makes the structure of the polymer electrolyte membrane more rigid and more compact. Moreover, the hydrophobicity of the polymer electrolyte membrane can be increased by further introducing a hydrophobic substituent to the polymer electrolyte membrane using the polysilsesquioxane group-containing copolymer. Therefore, the ionic conductivity of the polymer electrolyte membrane can be increased and methanol crossover can be reduced. Moreover, since the polysilsesquioxane group-containing copolymer can be dispersed homogeneously in a composition for preparing a polymer electrolyte membrane, the polysilsesquioxane group-containing copolymer also has the ability to homogeneously disperse the polysilsesquioxane which is an inorganic particle in a matrix composed of the ionic conductive polymer.

Among the polysilsesquioxane group-containing copolymers, a repeating unit (polymer) including the polysilsesquioxane group can increase the compatibility with the polymer electrolyte membrane. In one embodiment, the polysilsesquioxane group can also be introduced as a repeating unit forming the polymer main chain and can also be introduced as a side chain of the polymer. In an embodiment, the polymer may be polypropyl methacrylate, polyhydroxyethylmethacrylate, poly n-butylmethacrylate, poly t-butylmethacrylate, polymethylmethacrylate(PMMA), polystyrene(PS), poly t-butylstyrene, poly 3-methyl styrene, poly 4-methyl styrene, poly sec-butyl styrene, poly-methyl styrene, poly trans-methyl styrene, poly 2-chloro styrene, poly 3-chloro styrene, poly 4-chloro styrene, etc. In another embodiment, the polymer may be a copolymer including one or more monomers comprised in the above polymers. For example, according to an embodiment of the present invention, the polymer of the polysilsesquioxane group-containing copolymer may be PMMA homopolymer or PMMA-PS copolymer, or others.

The polysilsesquioxane group in the polysilsesquioxane group-containing copolymer reduces the free volume in the polymer electrolyte membrane and is able to make the structure of the polymer electrolyte membrane compact. In an embodiment, the polysilsesquioxane group, has —Si—O— linkage, and has various structures such as a linear, cyclic or cage type, etc. and as described above may be introduced to the polymer as a repeating unit forming the polymer main chain or as a side chain of the polymer.

In one embodiment, hydrophobic substituents in the silicon of the polysilsesquioxane group may be introduced to the polymer electrolyte membrane to increase the hydrophobicity of the polymer electrolyte membrane thereby. In an embodiment, the silicon may have one or more substituents selected from the groups of substituted or unsubstituted $C_1$-$C_{20}$ alkyl groups, substituted or unsubstituted $C_1$-$C_{20}$ alkoxy groups, and halogen but is not limited thereto.

According to an embodiment of the present invention the polysilsesquioxane group-containing copolymer may be represented by Formula 1 as follows:

Formula 1 wherein, $R_1$, $R_2$, $R_3$, $R_4$, $R_5$, $R_6$ and $R_7$ may be each independently, hydrogen, a substituted or unsubstituted $C_1$-$C_{20}$ alkyl group, a substituted or unsubstituted $C_1$-$C_{20}$ alkoxy group or halogen. $R_1$, $R_2$, $R_3$, $R_4$, $R_5$, $R_6$ and $R_7$ may be hydrophobic substituents which can increase the hydrophobicity of the polymer electrolyte membrane as described above.

$Z_1$ and $Z_2$ may be each independently a substituted or unsubstituted $C_1$-$C_{20}$ alkylene group.

$R_8$ may be a substituted or unsubstituted $C_1$-$C_{20}$ alkyl group.

B may be a repeating unit represented by one or more of Formulae 2 and 3 as follows:

Formula 2

Formula 3 wherein, $R_9$, $R_{10}$ and $R_{11}$ may be each independently a substituted or unsubstituted $C_1$-$C_{20}$ alkyl group, and $Z_3$ and $Z_4$ may be each independently a substituted or unsubstituted $C_1$-$C_{20}$ alkylene group, and $Ar_1$ may be a substituted or unsubstituted $C_6$-$C_{30}$ aryl group or a substituted or unsubstituted $C_5$-$C_{30}$ heteroaryl group. The substituted aryl group or substituted heteroaryl group represented by $Ar_1$ may have a functional group as a substituent. The functional group can further bond with one or more of R1-R7 in the silsesquioxane.

According to an embodiment, in Formula 1, a and b as mole fractions of a repeating unit may range from 0.05 to 0.95 each, for example 0.1-0.9, and a+b=1. By adjusting the values of a and b, the flexibility feature of the polysilsesquioxane group-containing copolymer can be changed.

In an embodiment, the weight average molecular weight of the polysilsesquioxane group-containing copolymer of Formula 1 may be in a range of 1,000-20,000.

In Formulae 2 and 3, the mark '*' represents a bond linkage with other repeating units.

In one embodiment, the polymer main chain in the polysilsesquioxane group-containing copolymer represented by Formula 1 may include two or more different repeating units, and the array of the repeating unit can be changed.

In an embodiment of the present invention, the polysilsesquioxane group-containing copolymer may have the structure of Formula 4 or Formula 11 as follows, but is not limited thereto.

Formula 4

Formula 11

In an embodiment, the weight average molecular weight of the polysilsesquioxane group-containing copolymer represented by Formula 4 and a and b in Formula 4 are the same as those described in Formula 1.

In one embodiment, examples of the unsubstituted $C_1$-$C_{20}$ alkyl group in Formulae 1-3 of the present invention include methyl, ethyl, propyl, isobutyl, sec-butyl, pentyl, iso-amyl, hexyl etc. In an embodiment, one or more of the hydrogen atoms in the alkyl group may be substituted by halogen, hydroxy, nitro, cyano, amino, amidino, hydrozine, hydrazone, carboxylic acid or its salt, sulfonic acid or its salt, phosphoric acid or its salt, or $C_1$-$C_{20}$ alkyl, $C_1$-$C_{20}$ alkenyl, $C_1$-$C_{20}$ alkynyl, $C_1$-$C_{20}$ heteroalkyl, $C_6$-$C_{20}$ aryl, $C_6$-$C_{20}$ arylalkyl, $C_6$-$C_{20}$ heteroaryl, or $C_6$-$C_{20}$ heteroarylalkyl.

In another embodiment, examples of the unsubstituted $C_1$-$C_{20}$ alkoxy group in Formulae 1-3 of the present invention include methoxy, ethoxy, pentoxy, etc. and, In one or more hydrogen atoms of the alkoxy group may also be substituted by the substituent of the alkyl group as above-described, for example halogen, hydroxy, nitro, cyano etc.

In one embodiment, the unsubstituted $C_6$-$C_{30}$ aryl group in Formulae 1-3 of the present invention may represent a carbocyclic aromatic system including one or more rings with a carbon number of 6-30. The rings may be bonded together or fused using a pendant method. Examples of the aryl group include phenyl, naphthyl, tetrahydronaphthyl etc. One or more hydrogen atoms in the aryl group may be substituted by the substituent of the alkyl group as above-described, for example, halogen, hydroxyl, nitro, cyano etc.

In another embodiment, the unsubstituted $C_5$-$C_{30}$ heteroaryl in Formulae 1-3 of the present invention represents a monocyclic or bicyclic aromatic compound which includes one, two or three heteroatoms selected from N, O, P or S, and includes C atoms as other ring atoms except the heteroatom. Examples of the heteroaryl group include pyridinyl, pyrazinyl etc. One or more hydrogen atoms in the heteroaryl may be substituted by the substituent as the above-described, for example, halogen, hydroxyl, nitro, cyano etc.

In one embodiment, the amount of the polysilsesquioxane group in the polysilsesquioxane group-containing copolymer may be in the range of 10-70 parts by weight based on 100 parts by weight of the polysilsesquioxane group-containing copolymer, for example 10-50 parts by weight. If the amount of the polysilsesquioxane group is less than 10 parts by weight based on 100 parts by weight of the polysilsesquioxane group-containing copolymer, the compactness of the polymer electrolyte membrane may not be as much as desired. If the amount of the polysilsesquioxane group exceeds 70 parts by weight based on 100 parts by weight of the polysilsesquioxane group-containing copolymer, the amount of the polymer main chain in the polysilsesquioxane group-containing copolymer is relatively so low that the polysilsesquioxane group-containing copolymer may not be well dispersed in the composition for preparing a polymer electrolyte membrane.

According to an embodiment of the present invention, the polymer electrolyte membrane includes an ionic conductive polymer as a matrix in addition to the polysilsesquioxane group-containing copolymer. The ionic conductive polymer may be selected from known polymers used for a polymer electrolyte membrane. For example, the ionic conductive polymer may be one or more selected from the group consisting of polyimide, polyalkylether, polyethylene carbonate, polyvinyl alcohol, polyethylene imine, NAFION™, sulfonated polyetheretherketone (SPEEK), sulfonated polyethersulfone (SPES), sulfonated polyetherether sulfone, perfluorinated polymer, polyvinylidene fluoride, polyvinylidene fluoride-co-hexafluoro propylene, terminal-capped polyamic acid, sulfonated poly(arylene ether ketone), sulfonated poly (arylene ether sulfone) and copolymers including one or more monomers comprised of above polymers but, is not limited thereto.

A non-limiting example of the polyimide may be represented by Formula 5 as follows:

Formula 5 wherein, m and n are each mole fractions, m is in a range of 0.1-0.9, for example, a range of 0.3-0.7, n is in a range of 0.1-0.9, for example, a range of 0.3-0.7 and m+n=1.

In an embodiment, the degree of polymerization of the polyimide is in a range of 5-1000.

A non-limiting example of the sulfonated poly(ether ketone) may be represented by Formula 6 as follows:

Formula 6 wherein, p and q are each mole fractions and, p is in a range of 0.2-0.8, for example, a range of 0.3-0.7, q is in a range of 0.2-0.8, for example, a range of 0.3-0.7 and, p+q=1.

In one embodiment, the weight average molecular weight of the sulfonated poly(ether ketone) is in a range of 20,000-100,000.

A non-limiting example of the sulfonated poly(ether sulfone) may be represented by Formula 7 as follows:

Formula 7 wherein, r and s are each mole fractions and r is in a range of 0.1-0.9, for example in a range of 0.3-0.7, s is in a range of 0.1-0.9, for example in a range of 0.3-0.7 and r+s=1.

In an embodiment, the weight average molecular weight of the sulfonated poly(ether sulfone) is in a range of 20,000-50,000.

A non-limiting example of the terminal-capped polyamic acid may be represented by Formula 8 as follows:

Formula 8

Y = HO—C ... C—OH, m/n = 95/5

In an embodiment, the degree of polymerization of the terminal-capped polyamic acid is in a range of 5-20.

According to an embodiment of the present invention, the amount of the polysilsesquioxane group-containing copolymer in the polymer electrolyte membrane may be in the range of 1-95 parts by weight based on 100 parts by weight of the ionic conductive polymer, for example in a range of 1 part-90 parts by weight. If the amount of the polysilsesquioxane group-containing copolymer is less than 1 part by weight based on 100 parts by weight of the ionic conductive polymer, the improvement of ion conductivity and methanol permeability suppression is negligible. If the amount of the polysilsesquioxane group-containing copolymer exceeds 95 parts by weight based on 100 parts by weight of the ionic conductive polymer, the ionic conductivity of the polymer electrolyte membrane may be decreased.

According to an embodiment of the present invention, the polymer electrolyte membrane may further include solid acids in addition to the polysilsesquioxane group-containing copolymer and the ionic conductive polymer. For example the solid acid may have Formula 9 or 10 as follows:

Formula 9

Formula 10

In an embodiment, the amount of the solid acid may be in the range of 0.1-40 parts by weight based on 100 parts by weight of the ionic conductive polymer, for example 1-30 parts by weight. If the amount of the solid acid is less than 0.1 parts by weight based on 100 parts by weight of the ionic conductive polymer, its effect as a solid acid may be negligible. If the amount of the solid acid exceeds 40 parts by weight based on 100 parts by weight of the ionic conductive polymer, the solid acid may leak out.

Hereinafter, a method of preparing the polymer electrolyte membrane according to an embodiment of the present invention will be described.

According to an embodiment of the present invention, the method of preparing the polymer electrolyte membrane may include: providing the composition for preparing a polymer electrolyte membrane including a polysilsesquioxane group-containing copolymer, an ionic conductive polymer and solvent; applying the composition to a substrate; and heating the applied composition.

The first step is providing the composition for preparing a polymer electrolyte membrane by mixing the polysilsesquioxane group-containing copolymer, the ionic conductive polymer and the solvent. Details of the polysilsesquioxane group-containing copolymer and the ionic conductive polymer and the amounts thereof have been described previously. The composition for preparing a polymer electrolyte membrane may further include the above-described solid acid.

In an embodiment, the solvent of the composition for preparing a polymer electrolyte membrane may be N-methyl-2-pyrrolidone, N,N'-dimethylacetamide, dimethylformamide, methylsulfoxide, or dimethylsulfoxide etc. but is not limited thereto. Using two or more of these solvents together may also be possible. In one embodiment, the amount of the solvent may be 1-99 weight % based on the composition for preparing a polymer electrolyte membrane. If the amount of the solvent is less than 1 weight % based on the composition for preparing a polymer electrolyte membrane, the coating performance, viscosity and others of the composition for preparing a polymer electrolyte membrane may be deteriorated. If the amount of the solvent exceeds 99 weight % based on the composition for preparing a polymer electrolyte membrane, the solid amount is too low.

The second step is applying the composition to a substrate. The method of application is not limited and, various known methods may be used, for example, spinning coating, bar coating, etc.

The next step is heating the applied composition.

In one embodiment, the heat treatment step is a hard baking process at a temperature of 120-250° C. If the heat treatment temperature is less than 120° C., the applied composition for preparing a polymer electrolyte membrane may not be fully cured. If the heat treatment temperature exceeds 250° C., the sulfonic acid group in the polymer electrolyte membrane may be decomposed. The time of the heat treatment is variable depending on the heat treatment temperature, and may be, for example, 5 min-24 hours.

According to an embodiment of the present invention, a pre-heat treatment step may be performed prior to the above-described hard baking process. The pre-heat treatment step is a soft baking process wherein some solvent included in the applied composition for preparing the polymer electrolyte membrane is removed at 60-110° C. If the temperature of the pre-heat treatment step is less than 60° C., too much time is needed to dry the solvent. If the temperature of the pre-heat treatment step exceeds 110° C., the solvent is removed so rapidly that uniformity of the polymer electrolyte membrane can not be ensured.

The time of the pre-heat treatment is variable depending on the pre-heat treatment temperature, and may be, for example, 5 min-4 hours.

The polymer electrolyte membrane obtained using the above process can be used as an electrolyte membrane in a fuel cell.

According to an embodiment of the present invention, the thickness of the polymer electrolyte membrane may be in a range of 5-200 μm. If the thickness of the polymer electrolyte membrane is less than 5 μm, the polymer electrolyte membrane is so thin that it may be torn. If the thickness of the polymer electrolyte membrane exceeds 200 μm, the polymer electrolyte membrane may be cracked.

Figure 5:
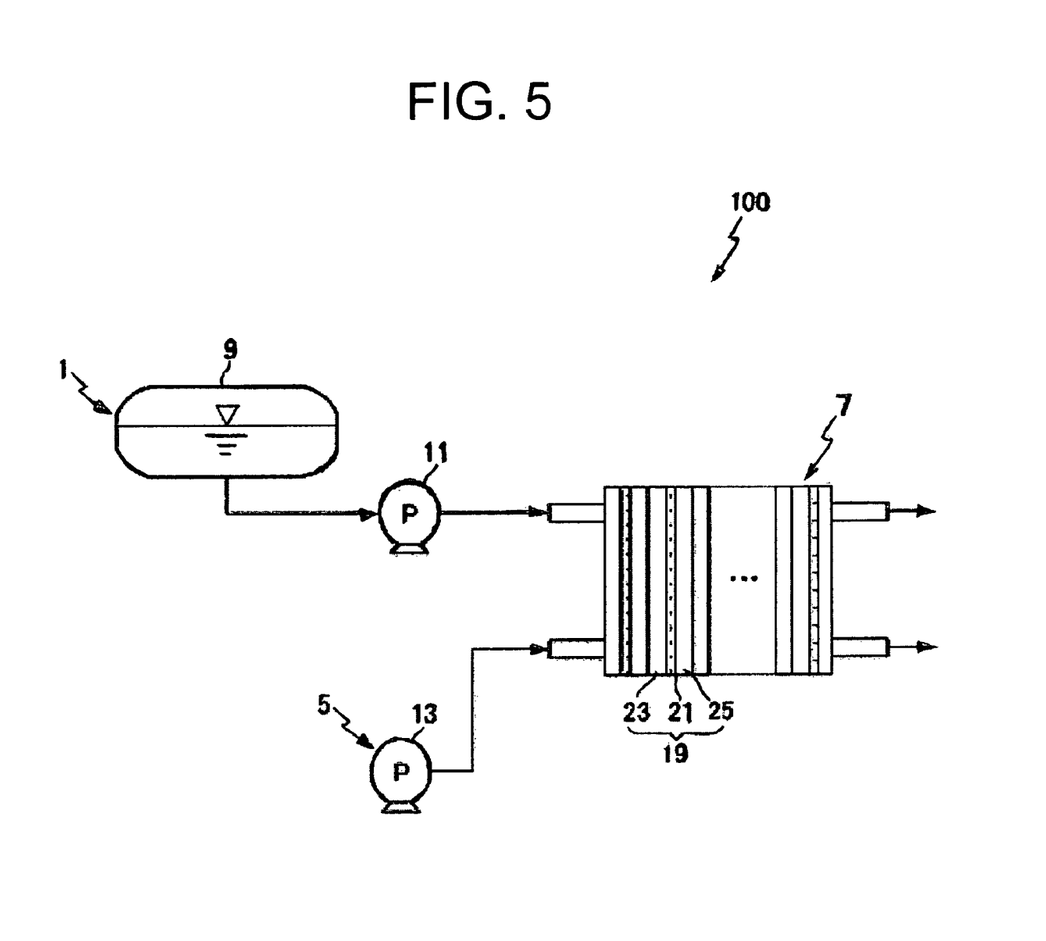
FIG. 5 is a schematic drawing of a fuel cell according to one embodiment of the invention.

A representative fuel cell system according to an embodiment of the invention is shown in FIG. 5. The fuel cell system 100 includes a fuel supplier 1, an oxygen supplier 5, and a fuel cell stack 7. The fuel supplier 1 includes a fuel tank 9 for containing a fuel such as methanol and a fuel pump 11 for supplying the fuel to the stack 7. The oxygen supplier 5 includes an oxygen pump 13 for supplying oxygen from air to the stack 7. The stack includes a plurality of electricity generating units 19, each comprising a Membrane Electrode Assembly 21 and separators 23 and 25. Each Membrane Electrode Assembly 21 comprises a polymer electrode membrane according to the present invention with an anode on a first side and a cathode on a second side.

Figure 6:
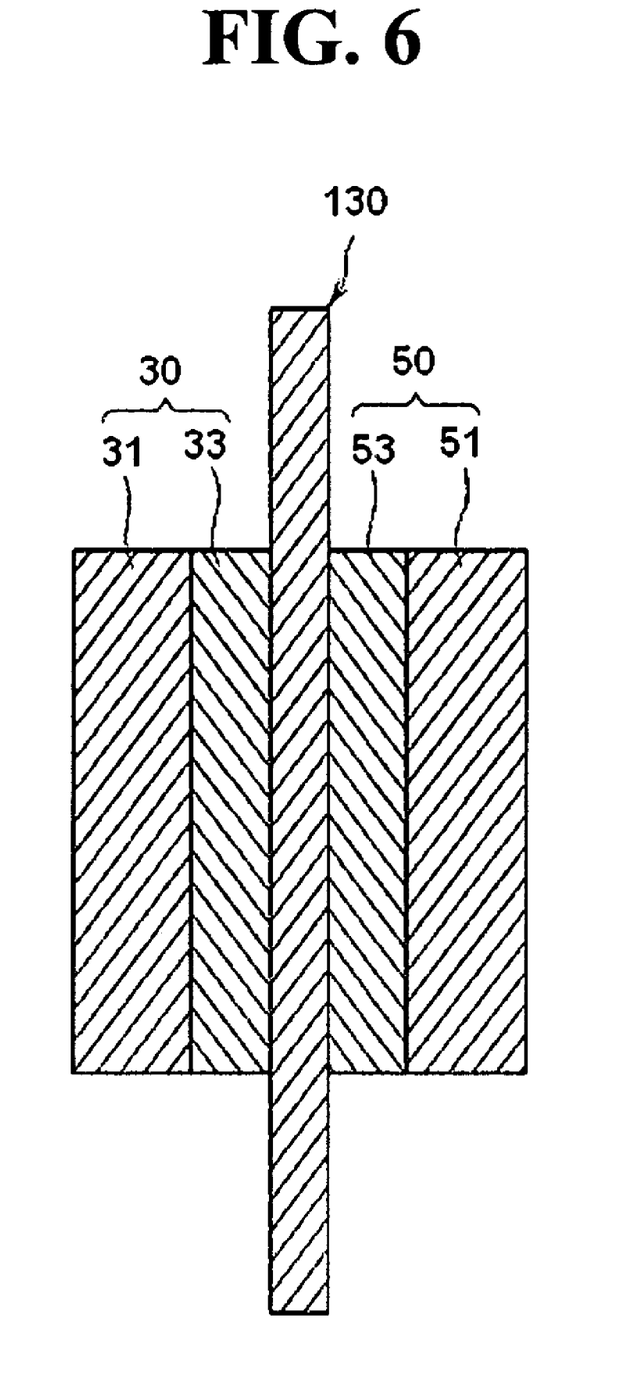
FIG. 6 is a schematic drawing of membrane electrode assembly according to one embodiment of the invention.

In one embodiment, the cathode and the anode each include a gas diffusion layer and a catalyst layer. Referring to FIG. 6, the membrane-electrode assembly includes a polymer electrolyte membrane 130, catalyst layers 33, 53 on both surfaces of the polymer electrolyte membrane 130, and gas diffusion layers 31, 51 disposed on the outside surfaces of the catalyst layers 33, 53.

The catalyst layer helps catalytically required reactions (oxidation of hydrogen and reduction of oxygen) in the fuel cell and includes metal catalysts such as one or more selected from the group consisting of platinum, ruthenium, osmium, platinum-osmium alloy, platinum-palladium alloy and platinum-M alloy (M is one or more transition metal selected from the group consisting of Ga, Ti, V, Cr, Mn, Fe, Co, Ni, Cu and Zn). In an embodiment, the catalyst layer may include one or more selected from the group consisting of platinum, ruthenium, osmium, platinum-ruthenium alloy, platinum-osmium alloy, platinum-palladium alloy, platinum-cobalt alloy and platinum-nickel alloy.

Furthermore, the metal catalyst is generally supported in a carrier. The carrier may be carbon such as acetylene black, carbon black or inorganic fine particles such as alumina, silica, etc. Noble metal supported by a carrier may be used as a catalyst which is commercially available. Preparing a noble metal supported by a carrier may also be possible.

The gas diffusion layer may be a carbon paper or a carbon cloth, but is not limited thereto. The gas diffusion layer supports a fuel cell electrode and diffuses reaction gas through the catalyst layer and so the reaction gas can easily access the catalyst layer. Furthermore, a gas diffusion layer formed of a carbon paper or a carbon cloth anti-moisturized with a fluorinated resin such as a polytetrafluoroethylene may prevent the gas diffusion rate from decreasing due to the water that is produced during fuel cell operation.

The fuel cell electrode may further include a microporous layer between the gas diffusion layer and the catalyst layer to increase the gas diffusion effect of the gas diffusion layer. The microporous layer is formed by applying a composition including a conductive material such as carbon powder, carbon black, active carbon and acetylene black etc., and a binder such as a polytetrafluoroethylene and an ionomer if necessary.

The fuel cell according to one embodiment of the present invention may be a phosphoric acid type fuel cell, a polymer electrolyte type fuel cell or an alkaline type fuel cell, for example, a direct methanol fuel cell.

Hereinafter, the present invention will be described with reference to the following examples. The following examples are for illustrative purposes only and are not intended to limit the scope of the invention.

EXAMPLE 1

A composition for preparing a polymer electrolyte membrane was prepared by mixing 3 parts by weight of poly[propylmethacryl-heptaisobutyl-POSS-co-methylmethacrylate] (available from Aldrich) as a polysilsesquioxane group-containing copolymer, 10 parts by weight of polyimide as an ionic conductive polymer and 87 parts by weight of N-methylpyrrolidone as a solvent.

Then the composition for preparing a polymer electrolyte membrane was applied to a substrate using a spin-coating method and pre-heated at 100° C. for about 10 min.

Subsequently the resultant was heated at approximately 200° C. for about 1.5 hours and a polymer electrolyte membrane (membrane thickness: about 17 μm) was obtained.

EXAMPLE 2

A polymer electrolyte membrane (membrane thickness: about 67 μm) was manufactured according to Example 1, except that 10 parts by weight of a sulfonated polyetheretherketone (SPEEK) was used as the ionic conductive polymer instead of polyimide.

EXAMPLE 3

A polymer electrolyte membrane (membrane thickness: about 87 μm) was manufactured according to Example 1 except that 6 parts by weight of polysilsesquioxane group-containing copolymer, 10 parts by weight of SPEEK and 84 parts by weight of N-methylpyrrolidone.

EXAMPLE 4

A polymer electrolyte membrane (membrane thickness: about 14 μm) was manufactured according to Example 1 except that 10 parts by weight of sulfonated polyethersulfone (SPES) as the ionic conductive polymer instead of polyimide was used.

EXAMPLE 5

A polymer electrolyte membrane (membrane thickness: about 48 μm) was manufactured according to Example 1 except that 6 parts by weight of polysilsesquioxane group-containing copolymer, 10 parts by weight of SPES and 84 parts by weight of N-methylpyrrolidone were used.

EXAMPLE 6

A polymer electrolyte membrane (membrane thickness: about 56 μm) was manufactured according to Example 1 except that an ionic conductive polymer formed of 10 parts by weight of sulfonated polyethersulfone (SPES) and 10 parts by weight of polyamic acid (PA) instead of polyimide and 3 parts by weight of polysilsesquioxane group-containing copolymer, and 77 parts by weight of N-methylpyrrolidone were used.

EXAMPLE 7

A polymer electrolyte membrane (membrane thickness: about 36 μm) was manufactured according to Example 1 except that 10 parts by weight of SPEEK, 6 parts by weight of polysilsesquioxane group-containing copolymer, 2 parts by weight of the compound represented by Formula 9 as a solid acid and 82 parts by weight of N-methylpyrrolidone were used.

EXAMPLE 8

A polymer electrolyte membrane (membrane thickness: about 54 μm) was manufactured according to Example 1 except that 10 parts by weight of SPES, 6 parts by weight of polysilsesquioxane group-containing copolymer, 2 parts by weight of the compound represented by Formula 9 as a solid acid and 82 parts by weight of N-methylpyrrolidone were used.

COMPARATIVE EXAMPLE 1

A polymer electrolyte membrane (membrane thickness: about 33 μm) was manufactured according to Example 1 except that 10 parts by weight of SPEEK as an ionic conductive polymer and 90 parts by weight of N-methylpyrrolidone as a solvent were used.

COMPARATIVE EXAMPLE 2

A polymer electrolyte membrane (membrane thickness: about 32 μm) was manufactured according to Example 1 except that 15 parts by weight of SPES as an ionic conductive polymer and 85 parts by weight of N-methylpyrrolidone were used.

COMPARATIVE EXAMPLE 3

A polymer electrolyte membrane (membrane thickness: about 32 μm) was manufactured according to Example 1 except that 10 parts by weight of SPES and 10 parts by weight of PA as an ionic conductive polymer, and 80 parts by weight of N-methylpyrrolidone were used.

EVALUATION EXAMPLE 1

The Measurement of the Ion Conductivity and the Methanol Permeability

The ion conductivity and the methanol permeability of each of the polymer electrolyte membranes of Examples 1-8 and Comparative Examples 1-3 were measured. The results are shown in Table 1. The ion conductivity was measured as follows. The polymer electrolyte membranes were immersed in distilled water for 24 hours and then placed between two electrodes and a complex impedance was measured at each frequency from 4 MHz to 1 Hz using a 2-point probe method impedance analyzer in AC(alternating current) (amplitude 10 mV). The ion conductivity was calculated with the measured resistance values of the polymer electrolyte membranes using Equation 1 as follows.

$$\sigma = I/(R \cdot S) \quad \text{Equation 1}$$

wherein, $\sigma$ represents ion conductivity, I is the thickness of a sample, R is the resistance of the membrane and S is the cross-sectional area of the electrode.

The methanol permeability was measured at room temperature using diffusion cells. To measure the permeability of methanol, the membrane was interposed between two cells and the concentration of the methanol permeating the membrane was measured in a constant time interval by gas chromatography analysis.

TABLE 1

| Division | weight percent ratio of ionic conductive polymer:polysilsesquioxane group-containing copolymer | the thickness of the polymer electrolyte membrane(μm) | proton conductivity (S/cm) | methanol permeability (cm²/s) |
|---|---|---|---|---|
| Example 1 | 10:3 | 17 | $6.65 \times 10^{-5}$ | $3.02 \times 10^{-8}$ |
| Comparative Example 1 | 10:0 | 33 | $1.01 \times 10^{-4}$ | $0.72 \times 10^{-7}$ |
| Example 2 | 10:3 | 67 | $3.64 \times 10^{-4}$ | $2.14 \times 10^{-7}$ |
| Example 3 | 10:6 | 87 | $2.93 \times 10^{-4}$ | $0.36 \times 10^{-7}$ |
| Comparative Example 2 | 15:0 | 32 | $3.46 \times 10^{-4}$ | $<10^{-6}$ |
| Example 4 | 10:3 | 14 | $0.70 \times 10^{-4}$ | $7.42 \times 10^{-8}$ |
| Example 5 | 10:6 | 48 | $3.36 \times 10^{-4}$ | $7.74 \times 10^{-7}$ |
| Comparative Example 3 | 20:0 | 32 | $1.81 \times 10^{-5}$ | $\sim 10^{-7}$ |
| Example 6 | 20:3 | 56 | $1.63 \times 10^{-4}$ | $6.52 \times 10^{-8}$ |
| Example 7 | 10:6 | 36 | $3.68 \times 10^{-4}$ | $1.18 \times 10^{-7}$ |
| Example 8 | 10:6 | 54 | $7.8 \times 10^{-4}$ | $7.52 \times 10^{-7}$ |

As is apparent from Table 1, the polymer electrolyte membranes with a polysilsesquioxane group-containing copolymer have greater ion conductivity and less methanol permeability than the polymer electrolyte membrane of the prior art.

Figure 1:
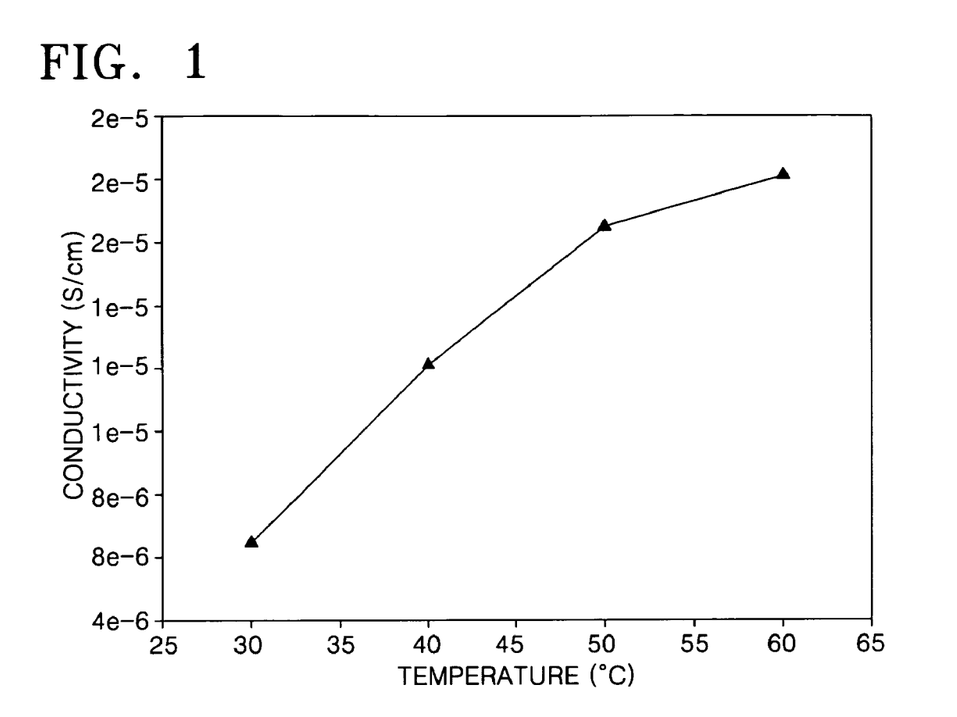
FIG. 1-FIG. 3 are graphs illustrating ionic conductivity of the polymer electrolyte membranes manufactured in Examples 1, 3 and 4 according to temperature and/or humidity.
Figure 2:
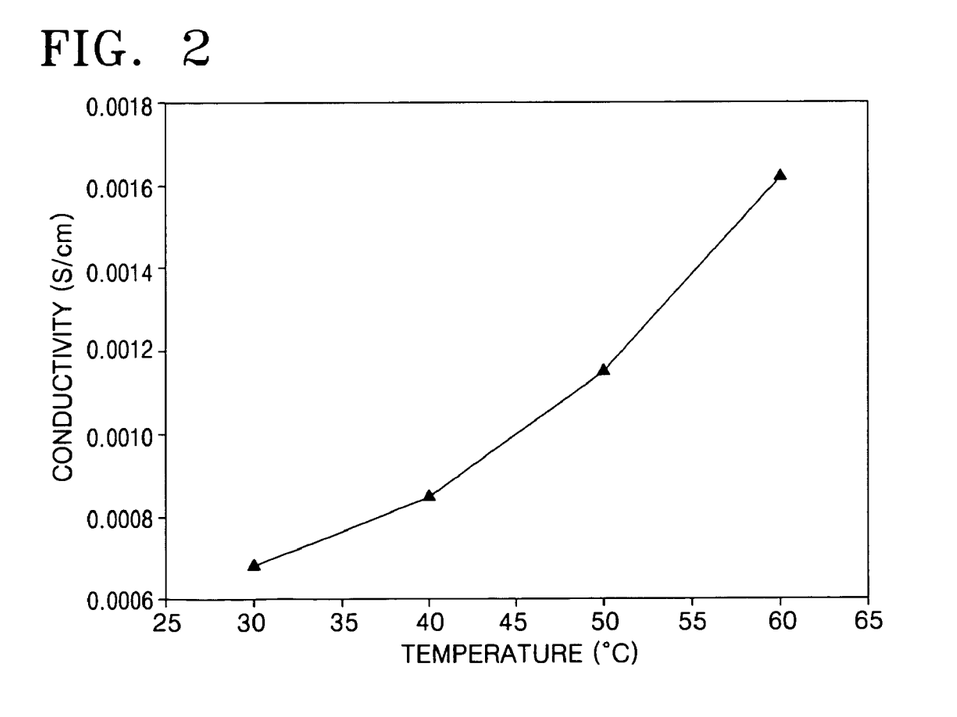
Figure 3:
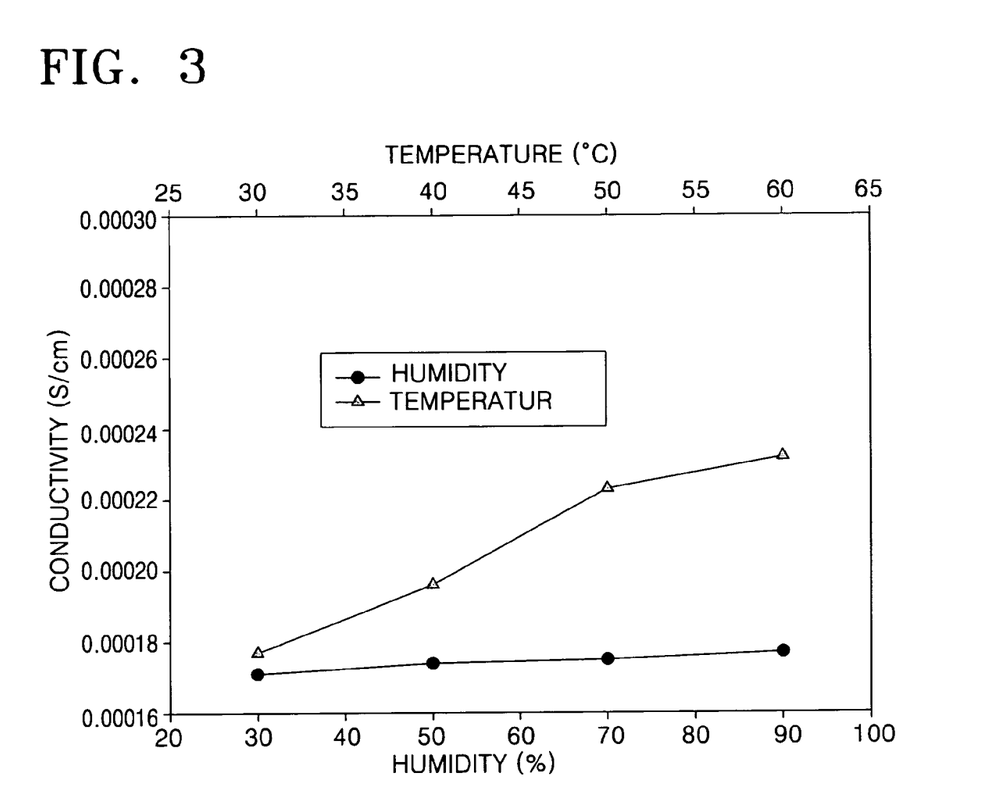

The temperature dependence of the proton conductivity of the polymer electrolyte membranes which were manufactured in Examples 1, 3 and 4 refer to FIGS. 1-3. The humidity dependence of the proton conductivity of the polymer electrolyte membranes which were manufactured in Example 4 is additionally shown in FIG. 3.

According to the present invention, FIGS. 1-3 show that the more the temperature or humidity increases, the more the proton conductivity of a polymer electrolyte membrane increases.

Figure 4:
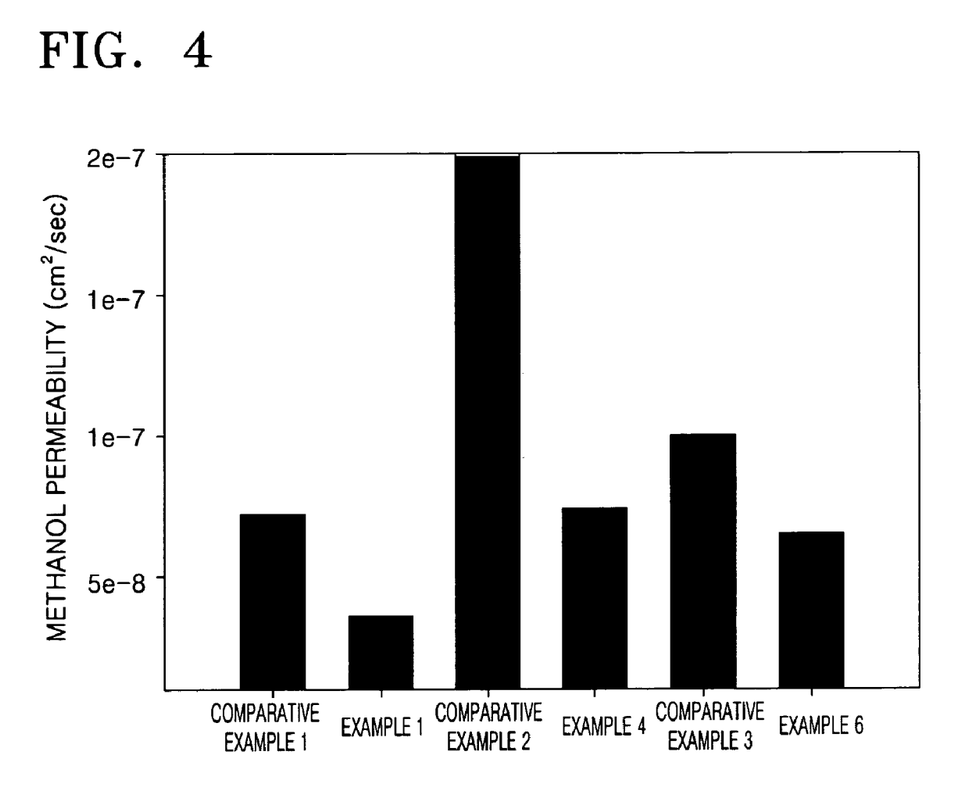
FIG. 4 is a graph illustrating methanol permeabilities of a polymer electrolyte membrane manufactured according to one embodiment of the present invention and a conventional polymer electrolyte membrane.

FIG. 4 is a graph illustrating methanol permeabilities of the polymer electrolyte membranes, which were manufactured in Comparative Example 1, Example 1, Comparative Example 2, Example 4, Comparative Example 3 and Example 6. According to FIG. 4, the polymer electrolyte membrane of the present invention has significantly lower methanol permeability than that of the polymer electrolyte membrane of the prior art.

According to the present invention, the polymer electrolyte membrane including a polysilsesquioxane group-containing copolymer exhibits an improved ion conductivity and/or an excellent ability to suppress methanol crossover.

The polymer electrolyte membrane can be used as an electrolyte membrane for a fuel cell, and in an embodiment, for a direct methanol fuel cell.

While the present invention has been shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer electrolyte membrane comprising:
a polysilsesquioxane group-containing copolymer; and
an ionic conductive polymer.

2. The polymer electrolyte membrane of claim 1, wherein a polymer copolymerized with polysilsesquioxane in the polysilsesquioxane group containing copolymer is selected from the group consisting of polypropyl methacrylate, polyhydroxyethylmethacrylate, poly n-butylmethacrylate, poly t-butylmethacrylate, polymethylmethacrylate(PMMA), polystyrene(PS), poly t-butylstyrene, poly 3-methyl styrene, poly 4-methyl styrene, poly sec-butyl styrene, poly-methyl styrene, poly trans-methyl styrene, poly 2-chloro styrene, poly 3-chloro styrene, poly 4-chloro styrene, copolymers thereof, and combinations thereof.

3. The polymer electrolyte membrane of claim 1, wherein the silicon of polysilsesquioxane in the polysilsesquioxane group-containing copolymer has a hydrophobic substituent selected from the group consisting of substituted or unsubstituted $C_1$-$C_{20}$ alkyl groups, substituted or unsubstituted $C_1$-$C_{20}$ alkoxy groups, halogens, and combinations thereof.

4. The polymer electrolyte membrane of claim 1, wherein the polysilsesquioxane group-containing copolymer is represented by Formula 1 as follows:

Formula 1 wherein,
$R_1$, $R_2$, $R_3$, $R_4$, $R_5$, $R_6$ and $R_7$ are each independently hydrogen, a substituted or unsubstituted $C_1$-$C_{20}$ alkyl group, a substituted or unsubstituted $C_1$-$C_{20}$ alkoxy group or halogen;

$Z_1$ and $Z_2$ are each independently a substituted or unsubstituted $C_1$-$C_{20}$ alkylene group;

$R_8$ is a substituted or unsubstituted $C_1$-$C_{20}$ alkyl group;

B is a repeating unit represented by one or more of Formulae 2 and 3 as follows, Formula 2

Formula 3 wherein, $R_9$, $R_{10}$ and $R_{11}$ are each independently a substituted or unsubstituted $C_1$-$C_{20}$ alkyl group;

$Z_3$ and $Z_4$ are each independently a substituted or unsubstituted $C_1$-$C_{20}$ alkylene group;

$Ar_1$ is a substituted or unsubstituted $C_6$-$C_{30}$ aryl group or a substituted or unsubstituted $C_5$-$C_{30}$ heteroaryl group;

a and b are mole fractions each ranging from 0.05 to 0.95, and a+b=1.

5. The polymer electrolyte membrane of claim 4, wherein the weight average molecular weight of the polysilsesquioxane group-containing copolymer represented by Formula 1 is in the range of 1,000 to 20,000.

6. The polymer electrolyte membrane of claim 1, wherein the polysilsesquioxane group-containing copolymer is represented by Formula 4 or Formula 11 as follows:

Formula 4

Formula 11 wherein, a and b are mole fractions each ranging from 0.05 to 0.95, and a+b=1.

7. The polymer electrolyte membrane of claim 6, wherein the weight average molecular weight of the polysilsesquioxane group-containing copolymer represented by Formula 4 is in the range of 1,000 to 20,000.

8. The polymer electrolyte membrane of claim 1, wherein the amount of the polysilsesquioxane group in the polysilsesquioxane group-containing copolymer is in the range of 10 parts by weight to 70 parts by weight based on 100 parts by weight of the polysilsesquioxane group-containing copolymer.

9. The polymer electrolyte membrane of claim 1, wherein the ionic conductive polymer is selected from the group consisting of polyimide, polyalkylether, polyethylene carbonate, polyvinyl alcohol, polyethylene imine, NAFION™, sulfonated polyetheretherketone (SPEEK), sulfonated polyethersulfone (SPES), sulfonated polyetherether sulfone, perfluorinated polymer, polyvinylidene fluoride, polyvinylidene fluoride-co-hexafluoro propylene, terminal-capped polyamic acid, sulfonated poly(arylene ether ketone), sulfonated poly (arylene ether sulfone), copolymers thereof, and combinations thereof.

10. The polymer electrolyte membrane of claim 1, wherein the amount of the polysilsesquioxane group-containing copolymer is in the range of 1 part by weight to 95 parts by weight based on 100 parts by weight of the ionic conductive polymer.

11. The polymer electrolyte membrane of claim 1, wherein the polymer electrolyte membrane further comprises a solid acid.

12. The polymer electrolyte membrane of claim 11, wherein the solid acid is represented by Formula 9 or 10 as follows:

Formula 9

Formula 10

13. A method of preparing a polymer electrolyte membrane, the method comprising:
providing a composition for preparing a polymer electrolyte membrane comprising a polysilsesquioxane group-containing copolymer, an ionic conductive polymer and a solvent;
applying the composition for preparing a polymer electrolyte membrane to a substrate; and
heating the applied composition for preparing a polymer electrolyte membrane.

14. The method of claim 13, wherein the solvent of the composition for preparing a polymer electrolyte membrane is selected from the group consisting of N-methyl-2-pyrrolidone, dimethylformamide, methylsulfoxide, dimethylsulfoxide, N,N'-dimethylacetamide, and combinations thereof.

15. The method of claim 13, wherein the amount of ionic conductive polymer of the composition for preparing a polymer electrolyte membrane is in the range of 1 weight % to 99 weight % based on the weight % of the composition for preparing a polymer electrolyte membrane.

16. A membrane-electrode assembly comprising:
a cathode;
an anode; and
the polymer electrolyte membrane of claim 1 interposed between the cathode and the anode.

17. The membrane-electrode assembly of claim 16, wherein the cathode comprises a carbon supported platinum catalyst layer and the anode comprises a carbon supported platinum-ruthenium catalyst layer.

18. A fuel cell comprising the membrane-electrode assembly of claim 16.

* * * * *